United States Patent [19]

Sell et al.

[11] 3,825,907

[45] July 23, 1974

[54] PLANAR CORE MEMORY STACK

[75] Inventors: Victor L. Sell, Santa Monica; Syed M. S. Alvi, Placentia, both of Calif.

[73] Assignee: Ampex Corporation, Redwood City, Calif.

[22] Filed: Oct. 5, 1971

[21] Appl. No.: 186,621

Related U.S. Application Data

[63] Continuation-in-part of Ser. No. 165,477, July 26, 1971, Pat. No. 3,711,839.

[52] U.S. Cl. .................. 340/174 MA, 340/174 AC, 340/174 CR, 340/174 DC, 340/174 M

[51] Int. Cl. .......................... G11c 5/08, G11c 11/06

[58] Field of Search... 340/174 M, 174 DC, 174 NC

[56] References Cited

UNITED STATES PATENTS

| | | | |
|---|---|---|---|
| 2,929,050 | 3/1960 | Russell | 340/174 DC |
| 3,381,281 | 4/1968 | Doughty et al. | 340/174 M |
| 3,500,359 | 3/1970 | Hsieh et al. | 340/174 NC |
| 3,560,943 | 2/1971 | Harding | 340/174 M |
| 3,636,533 | 1/1972 | Rathjen | 340/174 M |
| 3,656,129 | 4/1972 | Ezaki | 340/174 M |
| 3,699,546 | 10/1972 | McLean | 340/174 NC |
| 3,707,705 | 12/1972 | Howell | 340/174 NC |

*Primary Examiner*—James W. Moffitt

[57] ABSTRACT

A planar, pluggable core memory stack is provided having a variable word and bit length. The highly versatile stack includes a single printed circuit board having symmetrical plug connectors and printed circuits permitting either a first size memory to be mounted on one side with pluggable attachment in a first orientation or a different size memory to be mounted on the other side with pluggable connection in an opposite orientation. The number of bits in each word may be varied between one and 18 regardless of which side the cores are mounted on. The cores are grouped into closely spaced mats, one for each bit, and all of the mats lie in the same plane. The close core spacing, a four corner wiring technique, and a disclosed method of mounting components permits all of the core mats as well as diode decoder arrays to be mounted entirely on a selected side of the printed circuit board without interfering with circuits printed on the other side to accommodate a different size of memory. Disclosed alternative wiring arrangements include a common X and Y drive technique which reduces the number of driver switches by about 1/2 and a 3 1/2D configuration which permits a trade off between word and bit size or the number of address lines within a single board or the use of two planar stacks together with no increase in the number of address lines.

32 Claims, 10 Drawing Figures

PLANAR CORE MEMORY STACK

CROSS REFERENCE TO RELATED APPLICATION

This application is a continuation-in-part of application Ser. No. 165,477, filed July 26, 1971 and now U.S. Pat. No. 3,711,839, entitled "High Density Core Memory Matrix."

BACKGROUND OF THE INVENTION

1. Field of the Invention

This invention relates to core memories and more particularly to pluggable, planar stacks having variable word and bit lengths.

2. History of the Prior Art

Toroidal core memory elements which are switchable between two stable states of magnetic remanence have long been used for the manufacture of electronic memories. In a typical arrangement known as 3 wire-3D, the cores are arrayed in a plurality of matrices known as mats which typically have core elements arranged in rows and columns. Longitudinal drive wires are each inductively coupled by passing them through the cores in one row from each mat and latitudinal drive wires are also inductively coupled by passing them through the cores in one column from each mat such that when a half select current is passed through one longitudinal drive wire and one latitudinal drive wire a single core within each mat is uniquely selected to receive a full switching current. In a 3D arrangement, the corresponding longitudinal and latitudinal drive wires of each mat in a stack are connected in series so that one core in each mat, representing the various bits in a work, is simultaneously selected to receive a full switching current. Separate sense-inhibit wires for each mat pass through all of the cores in the mat, thus allowing the various bits of a word to be read in parallel. During a write operation, the switching of cores in selected mats is inhibited by passing a current through the sense-inhibit lines in the selected mats in a direction which couples the selected cores in a sense opposite to that of the two half select write currents. By using separate sense and inhibit lines and separate drive lines for each current direction, the number of wires within a 3D configuration may be increased from 3 to 4, 5 or 6.

Other memory arrangements include the 2D arrangement wherein the memory is similar to a huge single mat of the 3D type and the 2 1/2D arrangement wherein the cores are arranged in pairs of longitudinal rows with the corresponding cores from each row pair coupling the latitudinal drive lines in first and opposite senses. For any chosen pattern of current directions, the orthogonal currents are additive in one core of a pair and cancel in the other. Thus, any one chosen core can be selectively switched in either direction by controlling the directions of half select currents in the orthogonal drive lines.

Using presently known techniques for manufacturing a 3D stack of mats, a plurality of mats are separately assembled and wired. This is done on a mass production basis without regard to keeping track of which manufacturing batch the cores of a mat come from or by which operator they are assembled and wired. Thus, when several mats are combined to form a stack, they may have cores coming from different batches and may have been assembled by different persons. Although the differences between mats from different batches and assemblers are not great, they may be sufficient to lower the operating efficiency of a stack or even render it unsatisfactory.

In addition, each mat must be separately tested by connecting the many drive and sense-inhibit wires to a tester. Then they are disconnected from the tester and the drive wires are connected in series with the other mats of a stack. After a stack is assembled, the wires must again be connected to a tester to test the operation of all the mats when connected together. This is a very time consuming task as each mat may have hundreds of wires and there may be up to 18 or even 36 mats in a stack.

The conventional stack technique of placing each mat on a different substrate also has a limited space density because a minimum separation must be provided between substrates. In addition, the wiring connections between planes increase noise, resistance and capacitive and inductive coupling between adjacent wires.

SUMMARY OF THE INVENTION

The invention provides a planar, pluggable core memory stack having variable work and bit lengths, a closely spaced, double herringbone core arrangement, a four corner wiring technique, a printed circuit board having circuits printed on both sides thereof and connectors positioned symmetrically about an axis to permit pluggable attachment in opposite orientations when core mats are mounted on opposite sides thereof, and diode decoder arrays mounted by a single side mounting method. Because all of the mats within a stack are mounted to occupy mat positions which lie in a single plane adjacent a selected side of a printed circuit board, the cores for a stack may be taken from a single manufacturing batch and continuously wired at the same time by the same person. Not only is wiring time reduced but the uniformity which is attained assures better signal to noise ratios and fewer defective stacks.

The extremely versatile printed circuit board on which the mats are mounted includes connectors arranged symmetrically about an axis and printed circuits arranged to accommodate one size of memory on one side and a different size of memory on the other side, the connectors being pluggably attachable in opposite orientations depending upon which side of the board the mats are mounted on. This symmetrical arrangement permits the external connector wiring to remain the same for all word and bit size combinations. The connectors permit all of the mats of a stack to be connected simultaneously by simple plug connections whether for testing or for operation in a memory system. Diode decoder arrays are mounted on the printed circuit board along with the core mats using a single side component mounting method which increases utilization of board space without interfering with circuits printed on the other side.

An alternative common X and Y drive technique permits the number of driver switches to be reduced by one-half and an alternative 3 1/2D wiring arrangement adds even greater versatility. By merely utilizing the various combinations of a single stack arrangement and without further design efforts, the word sizes of a memory stack may be varied from 1024 through 8192 and the number of bits may be varied from 1 through 18.

Simultaneously, trade offs may be made between bit sizes, word sizes and the number of address lines for optimum cost and performance in a particular situation.

BRIEF DESCRIPTION OF THE DRAWINGS

A better understanding of the invention may be had from a consideration of the following detailed description taken in conjunction with the accompanying drawings in which.

DETAILED DESCRIPTION

Figure 1:
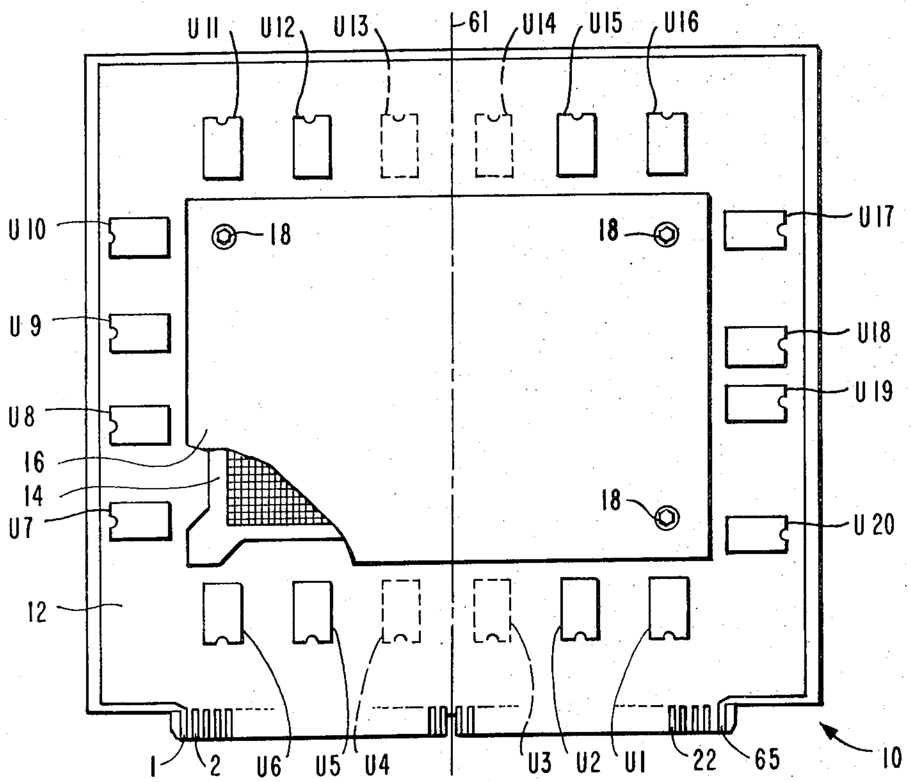
FIG. 1 is a plan view, partially broken away, of a planar, pluggable, variable word and bit length stack in accordance with the invention.
Figure 2:
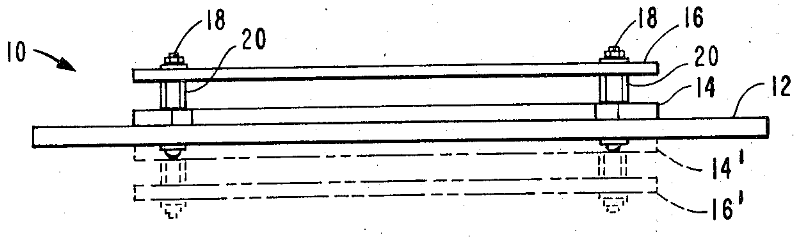
FIG. 2 is a side view of the invention as shown in FIG. 1.

As shown in FIGS. 1 and 2, a pluggable, planar stack with variable word and bit length 10 is provided having a pluggable printed circuit board 12 with a core substrate 14 and a cover 16 mounted thereon by means of bolt and nut assemblies 18 and spacers 20. A core substrate 14' and a cover 16' are shown in FIG. 2 in dotted lines to illustrate the selective mounting of the substrate 14 and cover 16 on either of the broad planar surfaces of the board 12. The substrate 14 and cover 16 are somewhat smaller in area than the board 12 and are mounted near the center of the board 12, leaving space around their periphery for also mounting integrated circuit dual inline packages containing diode decoder arrays in locations U1 – U20. Diode arrays U3, U4, U13 and U14 are shown in dotted outline form because they represent alternative locations for the diode arrays U11, U12, U5 and U6 respectively. Plug connections 22 are printed along a front edge of the board 12, there being 65 connections printed on each side.

Figure 3:
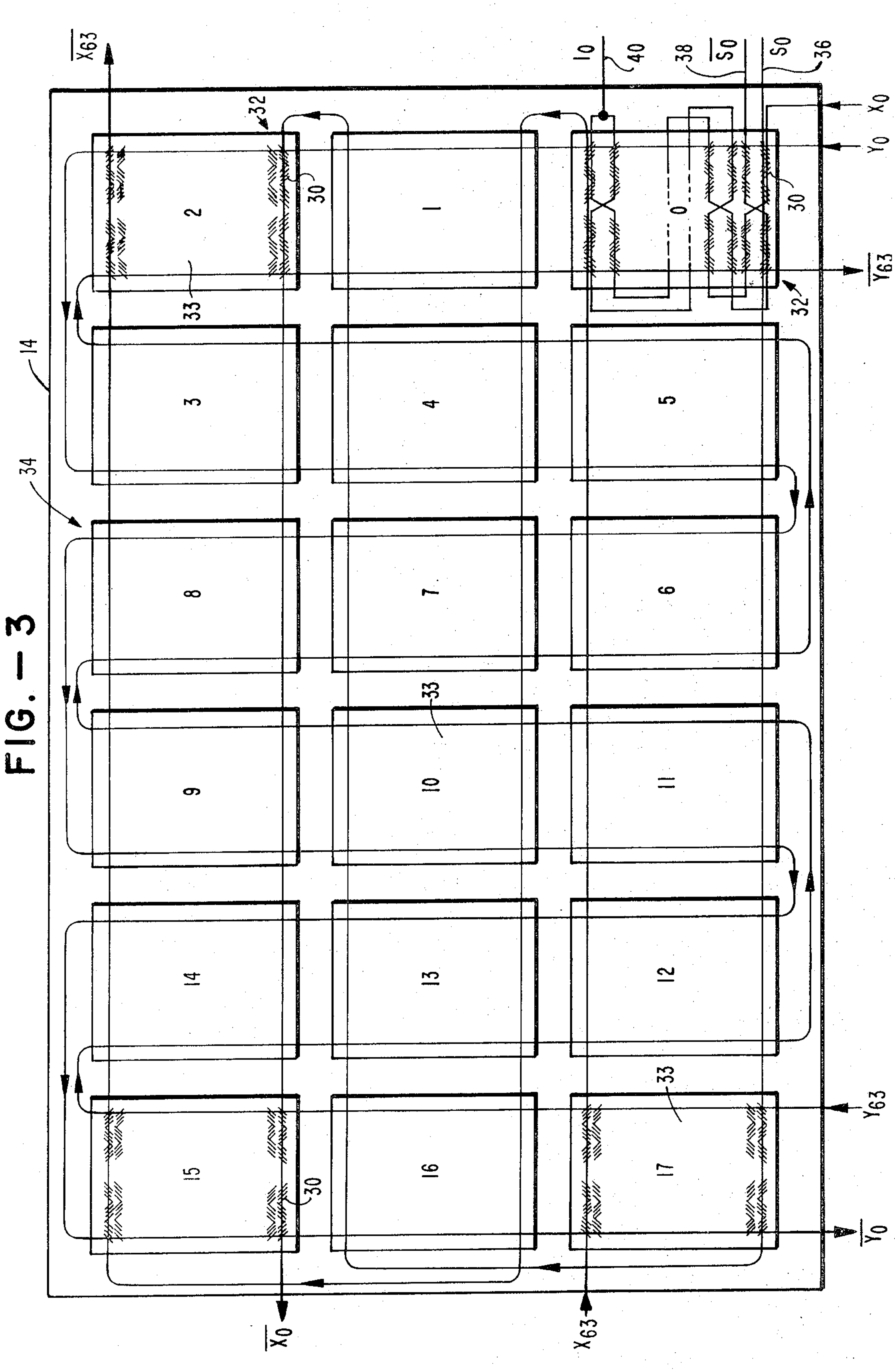
FIG. 3 is a diagram illustrating the layout and wiring of the planar stack shown in FIG. 1.

As shown in FIG. 3, a plurality of toroidal ferrite core memory elements 30 which are switchable between two stable states are mounted on the single planar substrate 14 but electrically grouped into 18 separate mats or matrices 32, each occupying a different mat position 33, numbered 0–17 for convenience of identification. The mat positions 33 are themselves arranged in a matrix 34 which has three rows and six columns in the disclosed arrangement.

Within each mat 32 the cores are arranged in a closely spaced, double herringbone pattern (only partially shown in FIG. 3) having 64 longitudinal rows numbered XO–X63, and 64 latitudinal columns numbered YO–Y63, thus providing for 4096 cores in each mat. This arrangement is more full disclosed in copending application Ser. No. 165,477, filed July 26, 1971, entitled "High Density Core Memory Matrix" and assigned to the assignee of this invention. The disclosore of that application is incorporated by reference as though fully set forth herein. Starting in the bottom row of cores (row XO) of the lowest row of mats 32, i.e. mats 0, 5, 6, 11, 12 and 17, the rows of cores are numbered consecutively from X0–X63 in alternately ascending and descending order. Thus row X63 in mat 0 is adjacent row X63 in mat 1 and row X0 in mat 1 is adjacent row X0 in mat 2. Similarly, the columns are numbered consecutively from Y0–Y63 in alternately ascending and descending order starting from the far righthand edge of the matrix 34. The row and column numbers for each mat 32 are demonstrated by drive wires X0, X63, Y0 and Y63 as shown in FIG. 3.

The closely spaced, double herringbone pattern for the core elements 30 requires that within a memory mat 32 the cores are arranged in similarly oriented groups in the longitudinal direction with the orientation being periodically reversed to obtain noise cancellation in the sense lines and to maintain inductive coupling of the drive wires in the proper sense as their direction alternates for each adjacent column of mat positions 33. Thus, in the latitudinal direction cores are grouped into similarly oriented pairs with adjacent pairs being oppositely oriented. In rows X0 and X2, the cores in columns Y0–Y15 are oriented in a first direction; the cores in columns Y16–Y31 are oriented in a second direction; the cores in columns Y32–Y47 are oriented in the first direction and the cores in columns Y48–Y63 are oriented in the second direction. Similarly, for rows X2 and X3 the cores are oriented in the second direction for columns Y0–Y15 and Y31–Y47 and in the first direction for columns Y16–Y31 and Y48–Y63. This pattern is repeated throughout each of the planes 32.

In addition to the single set of drive wires which continuously pass through all of the mats 32 without internal interruption, each mat 32 has an independent set of sense-inhibit wires illustrated by way of detailed example in mat 0 of FIG. 3. In the illustrated arrangement, a single set of wires provides both the sense and inhibit functions. The sense-inhibit wires can be considered to be a pair of wires 36, 38 having terminals S0 and $\overline{\textbf{S0}}$ threaded longitudinally through adjacent row pairs of cores starting with rows X0 and X1. The row assignments are reversed in each pair of rows between columns Y31 and Y32 for maximum noise cancellation and the opposite ends are connected together to form a center tap 40 designated I0 as they emerge from the mat in rows X62 and X63. When used for a sensing function, the center tap I0 is open circuited causing the wires to operate as a single wire with the signal appearing between terminals S0 and $\overline{\textbf{S0}}$. When used for an inhibit function, the center tap I0 becomes operative with current passing in parallel between the terminals S0 and $\overline{\textbf{S0}}$ and the center tap I0.

As word sizes and bit densities increase, physical accommodation of all of the wire connections that must be made in the limited space available becomes a serious problem. For instance, in the present arrangement as shown in FIG. 3, there are 64X drive lines and 64Y drive lines, each having an initial end and a sink end, and 18 sense-inhibit lines, each having three terminal ends. Thus, wiring connections must be made for 182 terminal ends plus the 20 diode decoder array locations shown in FIG. 1.

This wiring density problem is substantially relieved by using a four corner wiring technique for the X and Y drive lines, wherein the X and Y drive lines pass sequentially through rows and columns respectively of mat positions 33 beginning with one mat position 33 and ending with a different mat position 33 as illustrated by drive wires X0 and Y0. Only a portion of the drive wires begin or end with any one mat position 33. In the disclosed arrangement, one-fourth of the drive wires begin and one-fourth of the drive wires end at each of the four corner mat positions 33. These are positions 0 and 2 and alternatively 6 and 8 or 15 and 17.

If more than 9 bits are implemented, positions 15 and 17 form the corner mat positions and if nine or less bits are implemented, positions 6 and 8 form the corner positions.

There is no requirement that a mat position 33 be occupied by a mat 32. Depending upon the number of bits being implemented, even a corner mat position may be only a dummy mat position having no storage capacity. Guide elements, which may take the form of cores 30, are utilized in some rows and columns which are adjacent the periphery of the matrix of mat positions 33. These rows and columns form dummy mats in mat positions 33 which are not occupied by mats 32 to provide turnaround and anchor points to keep the drive wires aligned as though a mat 32 were present. As the number of bits is reduced from 18, the mats 32 are eliminated by columns moving left to right, completely eliminating one column of mats 32 before any mats 32 in the next column of mat positions 33 are deleted. In addition, it has been found desirable to maintain symmetry. Thus, first the center mat of a column of mat positions 33 is deleted, then the two outside mats are deleted retaining the center mat, and finally all of the mats 32 are are deleted from a column of mat positions 33.

The drive wires pass through all of the cores in each mat in the same magnetic sense regardless of physical core orientation. For this reason, the orientation of the core at X0, Y0 which extends from upper right to lower left is chosen as the reference orientation, the X0 drive wire is assigned a positive direction of right to left and the Y0 drive wire is ssigned a positive direction of bottom to top. It can be seen that in this coincident current arrangement the magnetic couplings are additive when the X and Y currents are both in the positive or both in the negative direction and this is true throughout each mat 32.

For this reason, as the four corner wiring scheme is implemented, care must be taken to assure that drive wires enter or exit the planar stack in the right place with the right current direction. The wiring terminations for this example of the four corner technique are given in the following table, Table I, wherein a non-barred wire designation as "Y10" indicates the initial end and a barred wire designation as "$\overline{Y10}$" indicates the sink end.

TABLE I. Drive Wire Ending

| | | | | | | | |
|---|---|---|---|---|---|---|---|
| Lower Righthand Corner Mat | | | | | | | |
| X0 | X8 | X32 | X40 | Y0 | $\overline{Y18}$ | Y32 | $\overline{Y50}$ |
| X1 | X9 | X33 | X41 | Y1 | $\overline{Y19}$ | Y33 | $\overline{Y51}$ |
| $\overline{X2}$ | $\overline{X10}$ | $\overline{X34}$ | $\overline{X42}$ | Y4 | $\overline{Y22}$ | Y36 | $\overline{Y54}$ |
| $\overline{X3}$ | $\overline{X11}$ | $\overline{X35}$ | $\overline{X43}$ | Y5 | $\overline{Y23}$ | Y37 | $\overline{Y55}$ |
| X4 | X12 | X36 | X44 | Y8 | $\overline{Y26}$ | Y40 | $\overline{Y58}$ |
| X5 | X13 | X37 | X45 | Y9 | $\overline{Y27}$ | Y41 | $\overline{Y59}$ |
| $\overline{X6}$ | $\overline{X14}$ | $\overline{X38}$ | $\overline{X46}$ | Y12 | $\overline{Y30}$ | Y44 | $\overline{Y62}$ |
| $\overline{X7}$ | $\overline{X15}$ | $\overline{X39}$ | $\overline{X47}$ | Y13 | $\overline{Y31}$ | Y45 | $\overline{Y63}$ |
| Upper Righthand Corner Mat | | | | | | | |
| X16 | X24 | X48 | X56 | $\overline{Y2}$ | Y16 | $\overline{Y34}$ | Y48 |
| X17 | X25 | X49 | X57 | $\overline{Y3}$ | Y17 | $\overline{Y35}$ | Y49 |
| $\overline{X18}$ | $\overline{X26}$ | $\overline{X50}$ | $\overline{X58}$ | $\overline{Y6}$ | Y20 | $\overline{Y38}$ | Y52 |
| $\overline{X19}$ | $\overline{X27}$ | $\overline{X51}$ | $\overline{X59}$ | $\overline{Y7}$ | Y21 | $\overline{Y39}$ | Y53 |
| X20 | X28 | X52 | X60 | $\overline{Y10}$ | Y24 | $\overline{Y42}$ | Y56 |
| X21 | X29 | X53 | X61 | $\overline{Y11}$ | Y25 | $\overline{Y43}$ | Y57 |
| $\overline{X22}$ | $\overline{X30}$ | $\overline{X54}$ | $\overline{X62}$ | $\overline{Y14}$ | Y28 | $\overline{Y46}$ | Y60 |
| $\overline{X23}$ | $\overline{X31}$ | $\overline{X55}$ | $\overline{X63}$ | $\overline{Y15}$ | Y29 | $\overline{Y47}$ | Y61 |
| Upper Lefthand Corner Mat — Ten or More Mats<br>Lower Lefthand Corner Mat — Nine or Less Mats | | | | | | | |
| $\overline{X0}$ | $\overline{X8}$ | $\overline{X32}$ | $\overline{X40}$ | Y2 | $\overline{Y16}$ | Y34 | $\overline{Y48}$ |
| $\overline{X1}$ | $\overline{X9}$ | $\overline{X33}$ | $\overline{X41}$ | Y3 | $\overline{Y17}$ | Y35 | $\overline{Y49}$ |
| X2 | X10 | X34 | X42 | Y6 | $\overline{Y20}$ | Y38 | $\overline{Y52}$ |
| X3 | X11 | X35 | X43 | Y7 | $\overline{Y21}$ | Y39 | $\overline{Y53}$ |
| $\overline{X4}$ | $\overline{X12}$ | $\overline{X36}$ | $\overline{X44}$ | Y10 | $\overline{Y24}$ | Y42 | $\overline{Y56}$ |
| $\overline{X5}$ | $\overline{X13}$ | $\overline{X37}$ | $\overline{X45}$ | Y11 | $\overline{Y25}$ | Y43 | $\overline{Y57}$ |
| X6 | X14 | X38 | X46 | Y14 | $\overline{Y28}$ | Y46 | $\overline{Y60}$ |
| X7 | X15 | X39 | X47 | Y15 | $\overline{Y29}$ | Y47 | $\overline{Y61}$ |
| Lower Lefthand Corner Mat — Ten Mats or More<br>Upper Lefthand Corner Mat — Nine Mats or Less | | | | | | | |
| $\overline{X16}$ | $\overline{X24}$ | $\overline{X48}$ | $\overline{X56}$ | $\overline{Y0}$ | Y18 | $\overline{Y32}$ | Y50 |
| $\overline{X17}$ | $\overline{X25}$ | $\overline{X49}$ | $\overline{X57}$ | $\overline{Y1}$ | Y19 | $\overline{Y33}$ | Y51 |
| X18 | X26 | X50 | X58 | $\overline{Y4}$ | Y22 | $\overline{Y36}$ | Y54 |
| X19 | X27 | X51 | X59 | $\overline{Y5}$ | Y23 | $\overline{Y37}$ | Y55 |
| $\overline{X20}$ | $\overline{X28}$ | $\overline{X52}$ | $\overline{X60}$ | $\overline{Y8}$ | Y26 | $\overline{Y40}$ | Y58 |
| $\overline{X21}$ | $\overline{X29}$ | $\overline{X53}$ | $\overline{X61}$ | $\overline{Y9}$ | Y27 | $\overline{Y41}$ | Y59 |
| X22 | X30 | X54 | X62 | $\overline{Y12}$ | Y30 | $\overline{Y44}$ | Y62 |
| X23 | X31 | X55 | X63 | $\overline{Y13}$ | Y31 | $\overline{Y45}$ | Y63 |

Figure 6:
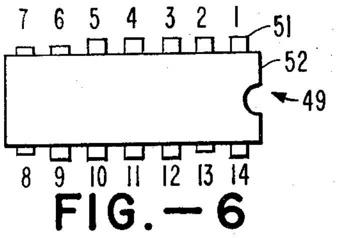
FIG. 6 is a plan view of a dual inline package housing a diode decoder array used in the planar stack as shown in FIG. 1.
Figure 7:
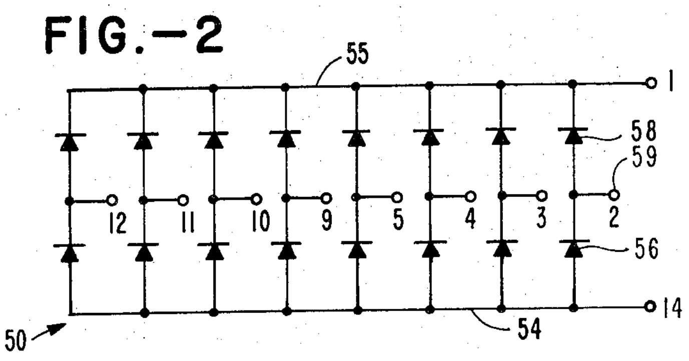
FIG. 7 is a schematic diagram of a diode decoder array used in the planar stack shown in FIG. 1.
Figure 8:
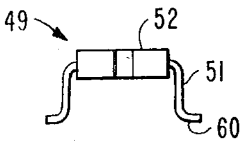
FIG. 8 is an end view of the dual inline package shown in FIG. 6.
Figure 4:
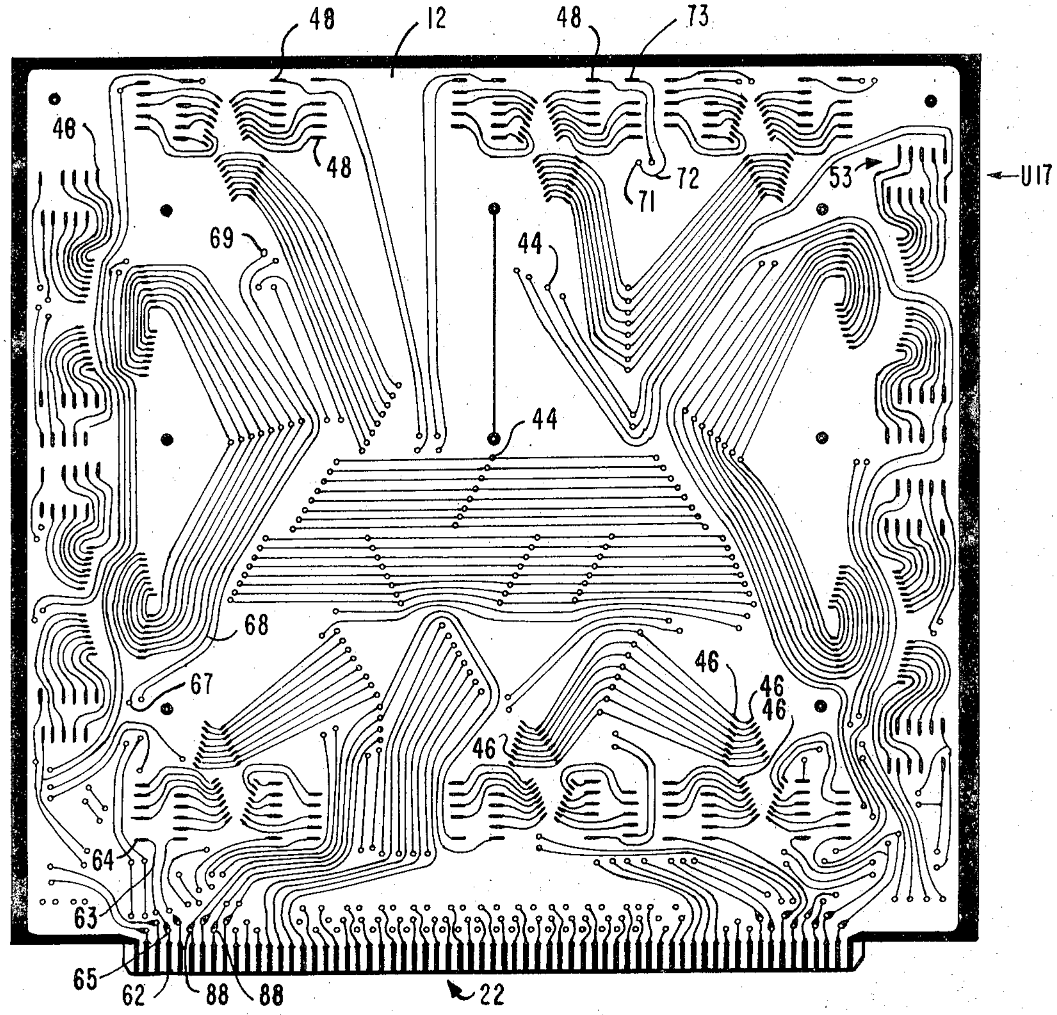
FIG. 4 is a plan view of a front side of a printed circuit board used in the planar stack shown in FIG. 1.
Figure 5:
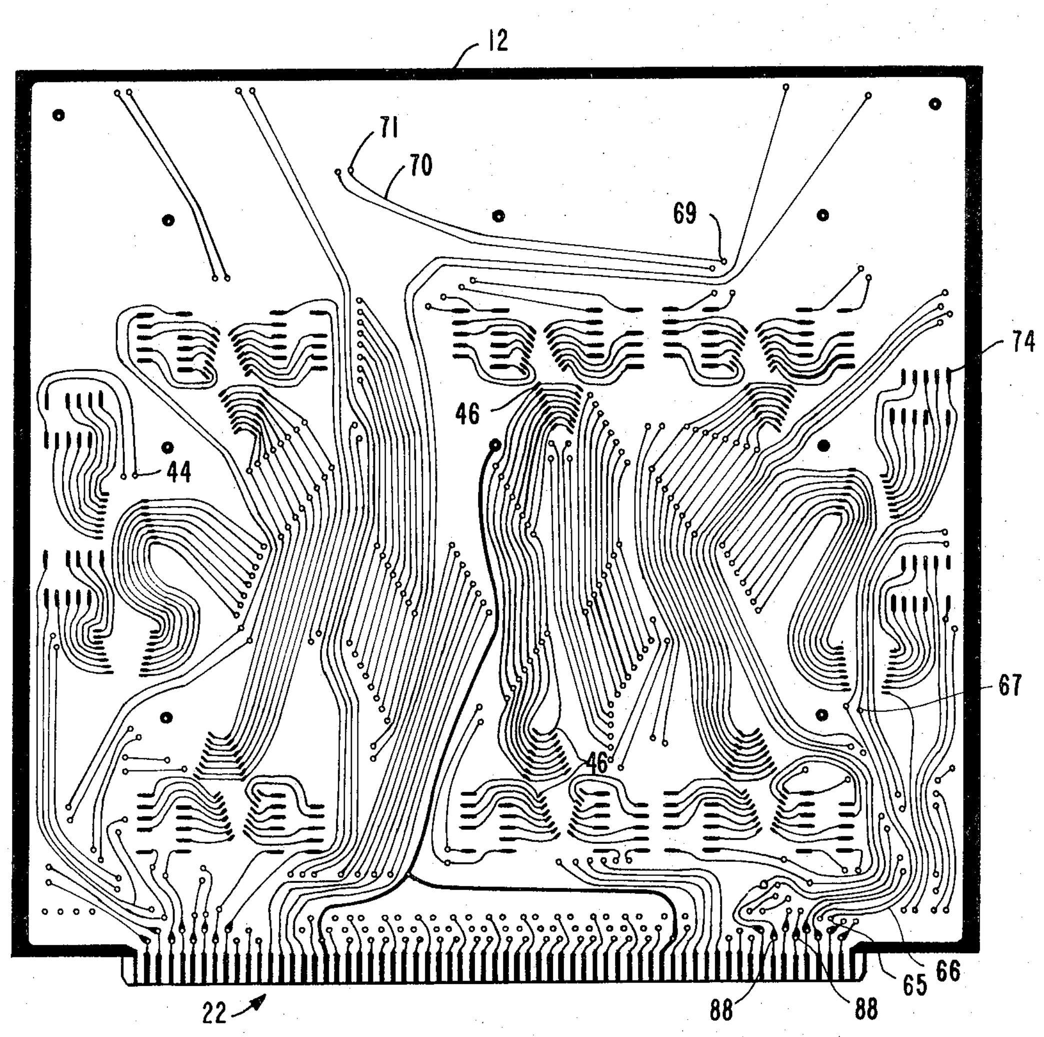
FIG. 5 is a plan view of a back side of the printed circuit board shown in FIG. 4.

The front and back sides of the printed circuit board 12 are shown in detail in FIGS. 4 and 5 respectively. Each of the dark circles 44 (except 16 circles nearest pins 2–9 and 77–64 on each side of the board 16) represents a plated through hole providing interconnection between a printed wire on the front side of the board 12 as shown in FIG. 4 and a printed wire on the back side of the board 12 as shown in FIG. 5. This technique permits double purpose use of the printed wires with a wire having one use when the core matrix is on one side of the board and another use when the core matrix is on the opposite side of the board. Each of the small pads 46 provides a solder connection for a wire ending from the core matrix and each of the large pads 48 provides a solder connection for one lead of a dual inline package 49 housing an integrated circuit diode decoder array 50 having leads 51 unidirectionally depending from a housing 52 as illustrated in FIGS. 6, 7 and 8. The pads 46 and 48 are terminal receiving points which are interconnected by printed circuits to the connectors 22.

Each of the decoder arrays 50 is a modified dual inline package 39 with spare leads 6, 7, 8 and 13 clipped to make the utilization of space on the printed circuit board 12 more efficient. As illustrated by the printed wires 53 for diode decoder array location U17 in FIG. 4, instead of directing the printed wires for leads 2–5 around the component location to provide communication with the other side, space underneath a component can be utilized by passing the wires for leads 2, 3 and 4, 5 underneath and through the gaps left by clipped leads 13 and 8 respectivley. As shown in FIG. 7, each decoder array 50 has a common anode (CA) 54 and a common cathode (CC) 55 connected to leads 14 and 1 respectively. Eight series connected pairs of diodes 56, 58 are connected to conduct current from the common anode 54 to the common cathode 55. A center tap 59 between the common junction of each pair of diodes is connected to one of the leads 2–5 and 9–12, each of which is in turn connected to the initial end of an X or Y drive wire. In this arrangement a positive or negative voltage on lead 14 or lead 1 will be transmitted to each of the drive wires connected to that diode decoder array 40, but a voltage induced on one of the drive wires is isolated from all other drive wires.

Dual inline packages 49 (DIP), such as those containing an integrated circuit diode decoder array 50, are manufactured with all leads depending unidirectionally downward parallel to one another. When used in a conventional manner, a DIP is mounted on the front side of a printed circuit board with the leads 51 extending through holes in the board to be connected to printed circuits on the back, as by wave soldering. However, as used herein tips 60 of the leads of a DIP 49 are bent perpendicularly to the depending direction and extend outward away from the package in a plane. The perpendicular plane must be spaced apart from the package at least a short distance, enabling the DIP 49 to be located on the printed circuit board 12 with the outwardly extending tips 60 of leads 51 in contact with solder pads 48 but without the housing 52 itself touching the board. The solder connections can then be completed by heating the solder pads with focused infrared light or some other technique. In this way, a DIP or other circuit component having downwardly depending leads may be easily and rapidly mounted on a single side of a printed circuit board without interfering with circuits printed on the other side.

Each of the center tap leads 2–5 and 9–12 is connected to the initial end of an X or Y drive line. The arrangement in which the initial drive line ends are connected in common to the various diode decoder arrays 50 is defined by Table II. The common diode decoder arrays 50 are designated by their electrical position within the memory 10 as by XC0 or YC1 and also by their physical location as shown in FIG. 1 in parenthesis as by (U20) or (U2). Within a diode decoder array 50 it is immaterial which drive line is connected to which center tap lead except for ease of physical layout.

TABLE II

| XC0 | (U20) | XC1 | (U9) | XC2 | (U18) | XC3 | (U7) |
|---|---|---|---|---|---|---|---|
| X0 | X1 | X2 | X3 | X16 | X17 | X18 | X19 |
| X4 | X5 | X6 | X7 | X20 | X21 | X22 | X23 |
| X8 | X9 | X10 | X11 | X24 | X25 | X26 | X27 |
| X12 | X13 | X14 | X15 | X28 | X29 | X30 | X31 |
| XC4 | (U19) | XC5 | (U10) | XC6 | (U17) | XC7 | (U8) |
| X32 | X33 | X34 | X35 | X48 | X49 | X50 | X51 |
| X36 | X37 | X38 | X39 | X52 | X53 | X54 | X55 |
| X40 | X41 | X42 | X43 | X56 | X57 | X58 | X59 |
| X44 | X45 | X46 | X47 | X60 | X61 | X62 | X63 |
| YC0 | (U1) | YC1 | (U11) | YC2 | (U16) | YC3 | (U6) |
| Y0 | Y1 | Y2 | Y3 | Y16 | Y17 | Y18 | Y19 |
| Y4 | Y5 | Y6 | Y7 | Y20 | Y21 | Y22 | Y23 |
| Y8 | Y9 | Y10 | Y11 | Y24 | Y25 | Y26 | Y27 |
| Y12 | Y13 | Y14 | Y15 | Y28 | Y29 | Y30 | Y31 |
| YC4 | (U2) | YC5 | (U12) | YC6 | (U15) | YC7 | (U5) |
| Y32 | Y33 | Y34 | Y35 | Y48 | Y49 | Y50 | Y51 |
| Y36 | Y37 | Y38 | Y39 | Y52 | Y53 | Y54 | Y55 |
| Y40 | Y41 | Y42 | Y43 | Y56 | Y57 | Y58 | Y59 |
| Y44 | Y45 | Y46 | Y47 | Y60 | Y61 | Y62 | Y63 |

Like the initial ends, the sink ends of the drive wires are also connected in common as 8X sink groups and 8Y sink groups of 8 wires each. Each of the eight wires within an X sink group has an initial end connected to a different diode decoder array 50 and the Y drive lines are similarly connected. Thus, a single drive line can be selected by selecting one common diode decoder array and one common sink group. The groupings for the sink ends of the X and Y drive lines are defined by Table III.

TABLE III

| X Sink 0 | | X Sink 1 | | X Sink 2 | | X Sink 3 | |
|---|---|---|---|---|---|---|---|
| $\overline{X2}$ | $\overline{X47}$ | $\overline{X3}$ | $\overline{X46}$ | $\overline{X6}$ | $\overline{X43}$ | $\overline{X7}$ | $\overline{X42}$ |
| $\overline{X18}$ | $\overline{X63}$ | $\overline{X19}$ | $\overline{X62}$ | $\overline{X22}$ | $\overline{X59}$ | $\overline{X23}$ | $\overline{X58}$ |
| $\overline{X0}$ | $\overline{X45}$ | $\overline{X1}$ | $\overline{X44}$ | $\overline{X4}$ | $\overline{X41}$ | $\overline{X5}$ | $\overline{X40}$ |
| $\overline{X16}$ | $\overline{X61}$ | $\overline{X17}$ | $\overline{X60}$ | $\overline{X20}$ | $\overline{X57}$ | $\overline{X21}$ | $\overline{X56}$ |
| X Sink 4 | | X Sink 5 | | X Sink 6 | | X Sink 7 | |
| $\overline{X10}$ | $\overline{X39}$ | $\overline{X11}$ | $\overline{X38}$ | $\overline{X14}$ | $\overline{X35}$ | $\overline{X15}$ | $\overline{X34}$ |
| $\overline{X26}$ | $\overline{X55}$ | $\overline{X27}$ | $\overline{X54}$ | $\overline{X30}$ | $\overline{X51}$ | $\overline{X31}$ | $\overline{X50}$ |
| $\overline{X8}$ | $\overline{X37}$ | $\overline{X9}$ | $\overline{X36}$ | $\overline{X12}$ | $\overline{X33}$ | $\overline{X13}$ | $\overline{X32}$ |
| $\overline{X24}$ | $\overline{X53}$ | $\overline{X25}$ | $\overline{X52}$ | $\overline{X28}$ | $\overline{X49}$ | $\overline{X29}$ | $\overline{X48}$ |
| Y Sink 0 | | Y Sink 1 | | Y Sink 2 | | Y Sink 3 | |
| $\overline{Y18}$ | $\overline{Y63}$ | $\overline{Y19}$ | $\overline{Y62}$ | $\overline{Y22}$ | $\overline{Y59}$ | $\overline{Y23}$ | $\overline{Y58}$ |
| $\overline{Y2}$ | $\overline{Y47}$ | $\overline{Y3}$ | $\overline{Y46}$ | $\overline{Y6}$ | $\overline{Y43}$ | $\overline{Y7}$ | $\overline{Y42}$ |
| $\overline{Y16}$ | $\overline{Y61}$ | $\overline{Y17}$ | $\overline{Y60}$ | $\overline{Y20}$ | $\overline{Y57}$ | $\overline{Y21}$ | $\overline{Y56}$ |
| $\overline{Y0}$ | $\overline{Y45}$ | $\overline{Y1}$ | $\overline{Y44}$ | $\overline{Y4}$ | $\overline{Y41}$ | $\overline{Y5}$ | $\overline{Y40}$ |
| Y Sink 4 | | Y Sink 5 | | Y Sink 6 | | Y Sink 7 | |
| $\overline{Y26}$ | $\overline{Y55}$ | $\overline{Y27}$ | $\overline{Y54}$ | $\overline{Y30}$ | $\overline{Y51}$ | $\overline{Y31}$ | $\overline{Y50}$ |
| $\overline{Y10}$ | $\overline{Y39}$ | $\overline{Y11}$ | $\overline{Y38}$ | $\overline{Y14}$ | $\overline{Y35}$ | $\overline{Y15}$ | $\overline{Y34}$ |
| $\overline{Y24}$ | $\overline{Y53}$ | $\overline{Y25}$ | $\overline{Y52}$ | $\overline{Y28}$ | $\overline{Y49}$ | $\overline{Y29}$ | $\overline{Y48}$ |
| $\overline{Y8}$ | $\overline{Y37}$ | $\overline{Y9}$ | $\overline{Y36}$ | $\overline{Y12}$ | $\overline{Y33}$ | $\overline{Y13}$ | $\overline{Y32}$ |

To further accommodate the locating of the core matrix 34 on either side of the printed circuit board 12, the plug connections are arranged symmetrically about an axis 61 (FIG. 1). In the disclosed arrangement the axis 61 lies in the plane of the board 12 perpendicular to the center of the edge on which the connectors 22 are printed. Thus, when a 4K memory is placed on the front side, the board 12 is plugged in with a first orientation and when a 2K or 1K memory is placed on the back side, the board 12 is merely rotated 180° about the axis of symmetry 61 and plugged in with an opposite orientation. The pin connector assignments are presented in Table IV with the pin locations being numbered 1–65 from left to right as shown in FIGS. 1 and 4 and right to left as shown in FIG. 5 when the core elements are mounted on the front side.

TABLE IV. Pin Assignments

| PIN NO. | NON-CORE SIDE | CORE SIDE | PIN NO. | NON-CORE SIDE | CORE SIDE |
|---|---|---|---|---|---|
| 1 | Ground | Ground | 34 | I14 | $\overline{S14}$ |
| 2 | XCA1 | YCA1 | 35 | S1 | $\overline{S1}$ |
| 3 | XCC1 | YCC1 | 36 | S12 | I1 |
| 4 | XCA3 | YCA3 | 37 | I12 | $\overline{S12}$ |
| 5 | XCC3 | YCC3 | 38 | S16 | $\overline{S16}$ |
| 6 | XCA5 | YCA5 | 39 | S10 | I16 |
| 7 | XCC5 | YCC5 | 40 | I10 | $\overline{S10}$ |
| 8 | XCA7 | YCA7 | 41 | S3 | $\overline{S3}$ |
| 9 | XCC7 | YCC7 | 42 | S13 | I3 |
| 10 | Spare | Spare | 43 | I13 | $\overline{S13}$ |
| 11 | Spare | Spare | 44 | S17 | $\overline{S17}$ |
| 12 | Spare | Spare | 45 | S2 | I17 |
| 13 | X Sink 7 | X Sink 6 | 46 | I2 | $\overline{S2}$ |
| 14 | X Sink 5 | X Sink 4 | 47 | Spare | Spare |
| 15 | X Sink 3 | X Sink 2 | 48 | Ground | Ground |

TABLE IV. Pin Assignments-Continued

| PIN NO. | NON-CORE SIDE | CORE SIDE | PIN NO. | NON-CORE SIDE | CORE SIDE |
|---|---|---|---|---|---|
| 16 | X Sink 1 | X Sink 0 | 49 | Spare | Spare |
| 17 | RTI-1 | RTI-1 | 50 | Y Sink 0 | Y Sink 1 |
| 18 | Ground | Ground | 51 | Y Sink 2 | Y Sink 3 |
| 19 | RTI-2 | RTI-2 | 52 | Y Sink 4 | Y Sink 5 |
| 20 | S11 | $\overline{S11}$ | 53 | Y Sink 6 | Y Sink 7 |
| 21 | S6 | I11 | 54 | Spare | Spare |
| 22 | I6 | $\overline{S6}$ | 55 | Spare | Spare |
| 23 | S15 | $\overline{S15}$ | 56 | Spare | Spare |
| 24 | S9 | I15 | 57 | XCA6 | YCA6 |
| 25 | I9 | $\overline{S9}$ | 58 | XCC6 | YCC6 |
| 26 | $\overline{S5}$ | $\overline{S5}$ | 59 | XCA4 | YCA4 |
| 27 | S7 | I5 | 60 | XCC4 | YCC4 |
| 28 | I7 | $\overline{S7}$ | 61 | XCA2 | YCA2 |
| 29 | S0 | $\overline{S0}$ | 62 | XCC2 | YCC2 |
| 30 | S4 | I0 | 63 | XCA0 | YCA0 |
| 31 | I4 | $\overline{S4}$ | 64 | XCC0 | YCC0 |
| 32 | S8 | $\overline{S8}$ | 65 | Ground | Ground |
| 33 | S14 | I8 | | | |

As an example explaining the two-side reversible printed circuit and connector arrangement, consider the interconnections of the Y common anode 3 (YCA3) corresponding to pin No. 4 (62 in FIG. 4) when the core matrix is mounted on the front side of the board 12 as shown in FIG. 1. This pin is directly coupled via printed wire 63 to pad 64 which couples to the common anode lead YCA3 of decoder matrix 3 which is identified as decoder U6 in FIG. 1. This is one of the two alternative positions for Y decoder matrix 3, the other being position U14 as shown in FIG. 1. When there are nine or less mats 32, these drive lines begin at mat position 8 (FIG. 2) and diode decoder position U14 is used. When there are ten or more mats, these drive lines begin at mat position 17 and are connected at diode decoder position U6.

The connection of pin 62 to diode decoder position U14 is accomplished through a series of printed wires on both sides of the board 12. Hole connector 65 provides a connection to printed wire 66 on the back side of the board 12 which in turn connects through plated hole 67 to wire 68 on the front side. Wire 68 connects with the solder pad through plated hole 69 to printed wire 70 on the back side of the printed circuit board 12. Wire 70 connects through plated hole 71 to printed wire 72 which connects to the solder pad 73 which receives the common anode lead YCA3 at decoder position U14. The pin 62 (No. 4) also connects through the plated hole 65 and printed wire 66 to a pad 74 which receives the common cathode lead XCC2 for common decoder array XC2. This third interconnection is required because when a core matrix is mounted on the back side of the board 12 and the board 12 is rotated 180° about the central axis before a plug connection is made, pin 62 becomes pin No. 62 on the non-core side and as shown in Table IV must connect to the XCC2 lead of decoder array XC2.

Similarly, all of the pins on both sides of the board 12 are interconnected with the proper pads for making correct wiring connections regardless of the number of mat positions which are occupied or the side of the board on which they are mounted. Although a single pin connector 22 may be interconnected with as many as three solder pads, only one is used for any given memory arrangement so that there is no conflict.

The back side of the board 12 as shown in FIG. 5 is designed to accommodate 1–18 mats 32 having 32X drive wires and either 32 or 64 Y drive wires, thus providing 1024 and 2048 word memories respectively. Because of the smaller number of X drive wires, only four X decoder positions are provided on the back side of the board 12. However, eight Y decoder locations plus four alternate locations are provided on the back side just as on the front side.

Figure 9:
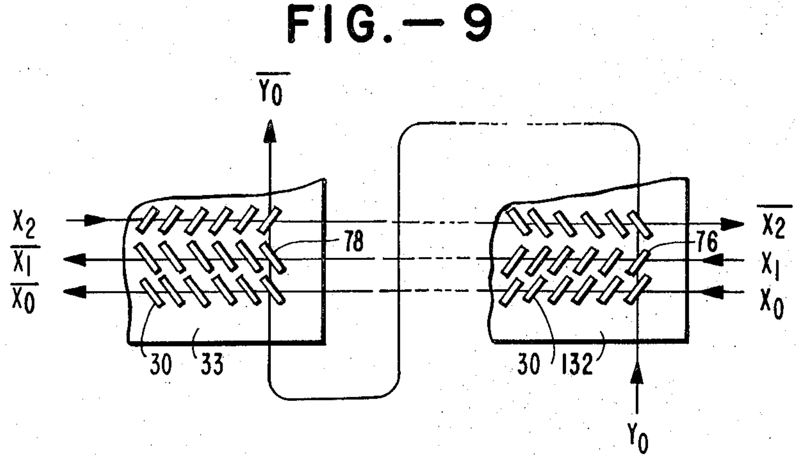
FIG. 9 is a diagram, partially broken away, illustrating an alternative embodiment of a planar stack in accordance with the invention.

A 3-1/2 D memory configuration can be used to add even more versatility to a core memory 10 in accordance with the invention, as shown in FIG. 9, by orienting cores 30 in some mat positions 132 in a coincident current configuration as illustrated by core element 76 while orienting cores 30 in other mat positions 33 in an opposite anti-coincident current configuration as shown by core element 78. This reversal technique permits a doubling of the number of words with no increase in the number of drive wires or address lines. For instance, if it is desired to write a "1" into the core at position X1, Y0, positive half select currents are forced through drive wires X1 and Y0. These currents additively couple cores 76 at the selected location in the coincident mats 132 causing them to switch, but oppositely couple corresponding cores 78 in the oppositely oriented anti-coincident mats 33. Alternatively, cores 78 can be switched by applying plus X and minus Y or minus X and plus Y currents without affecting the cores 76.

This opposite orientation technique can be used in a variety of ways. When placing the core mats on the front side of printed circuit board 12, half of the mats can be driven in a coincident current sense and half in an anti-coincident current sense, providing a maximum capacity of 8K words by 9 bits with 64X and 64Y drive lines. If desired, the sense and inhibit lines for oppositely oriented pairs of mats 32 may remain completely separate, thereby providing in effect two memories each of 4K words by 9 bits on a single printed circuit board 12. In another arrangement, the cores of all mats on one board can have a coincident arrangement while those on a second board have an anti-coincident arrangement. If the sense-inhibit lines of corresponding pairs of mats on the two boards were connected in parallel, the net effect would be a maximum memory size of 8192 words by 18 bits with only 64X and 64Y drive wires. Similarly, the back sides of one or more boards 12 may be used to attain 2K or 4K word memories with only 32X and 32Y or 32X and 64Y drive wires respectively. This allows a designer an alternative of doubling the word sizes or reducing the number of drive wires and address lines in attaining a desired memory size.

Figure 10:
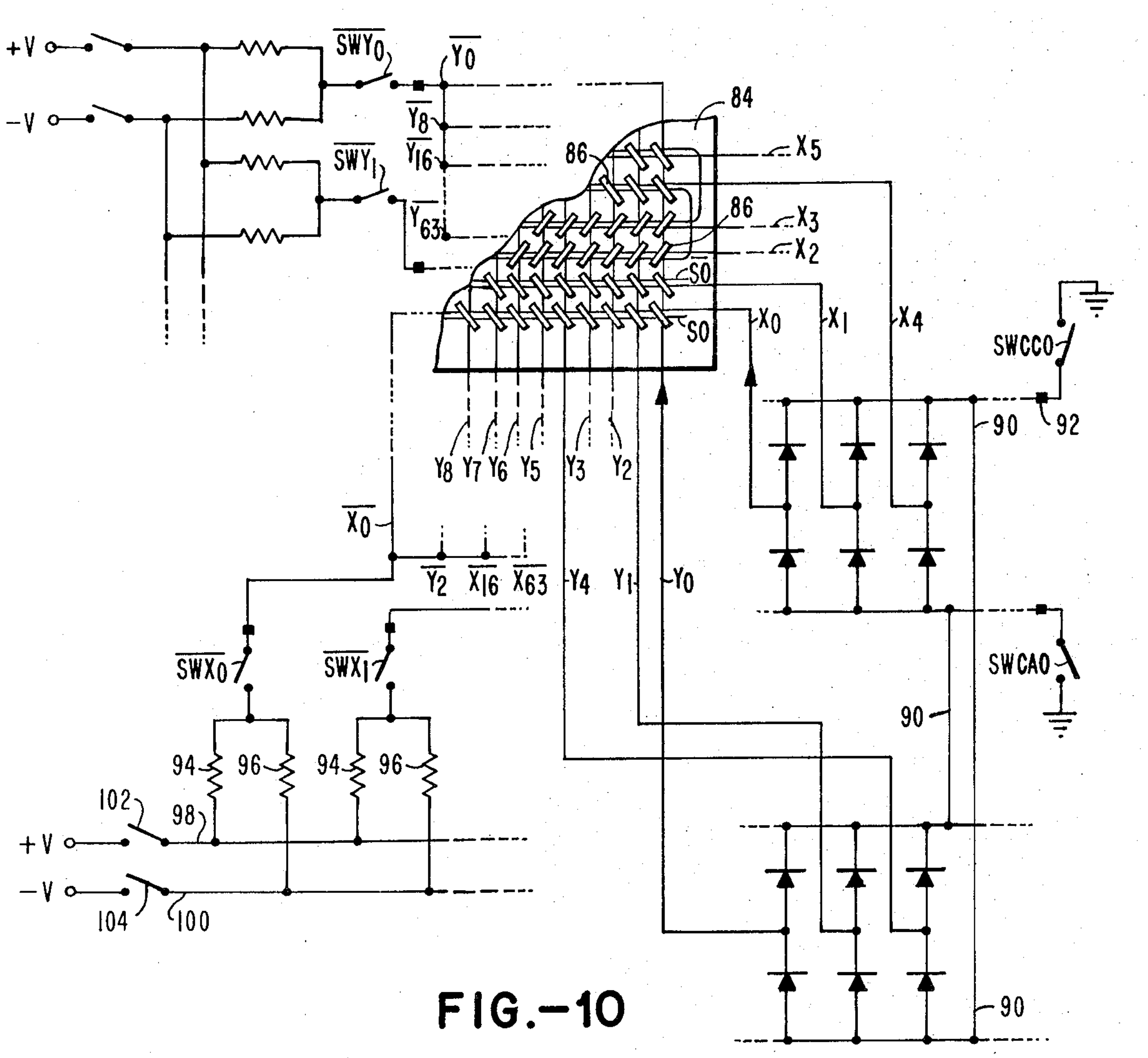
FIG. 10 is a diagram, partially broken away, illustrating another alternative embodiment of a planar stack in accordance with the invention.

Still another technique, called common X and Y drive, may be used to further increase the versatility of a core memory in accordance with the invention. The common X and Y drive scheme reduces by approximately one-half the number of driver switches that are required. This scheme is illustrated in FIG. 10 where there is shown a substrate 84 having matrices of bistable switchable core memory elements 86 thereon similar to the substrate 14 and elements 30 (FIG. 3) except that the cores 86 have an anti-coincident current orientation. While the common X and Y drive scheme is illustrated for purposes of this example as being in conjunction with a planar stack, it is equally applicable to a conventional stack having mats located in separate planes. In addition to the 64X drive wires and the 64Y drive wires passing through the 64 rows and 64 columns respectively, a pair of sense-inhibit wires pass through the longitudinal rows of cores 86 in each mat 32. These wires are labeled S0 and $\overline{\text{S0}}$ for the 0 mat in the lower righthand corner of the substrate 84.

The drive wires may be connected at their initial ends to diode decoder arrays 50 in the same manner as defined by Tables I and II and at their sink ends in the same manner as defined by Tables I and III. Thus, except for a reversal of the core orientations and the interconnection by jump wires of corresponding X and Y diode decoder array common terminals, the circuit board assembly is the same for a common X and Y drive arrangement as for an independent drive arrangement.

By referring to pin connections 2–9 and 57–64 as defined in Table IV, it can be seen that the pairs of common drive terminals which must be jumpered together are located at the same pin position on opposite sides of the printed circuit board 12. For instance, common terminal XCA1 is on the non-core side of pin location 2 and YCA1 is on the core side of pin location 2. Solder pad rimmed holes 88 (FIGS. 4 and 5) extend through the board 12 to provide convenient communication between corresponding pin connectors on opposite sides thereof. These holes 88 are not internally plated as are the holes 44 located elsewhere on the board 12. Thus, the pins are not electrically connected under normal circumstances. However, the common X and Y drive scheme can be implemented by merely passing a tiny jumper wire 90 (FIG. 10) through the holes 88 and soldering it to the solder pad rims at opposite ends thereof.

In addition to the slight modification on the circuit board 12, some modifications in the external driver circuitry are also required to implement the common X and Y drive scheme. As shown in FIG. 10, pin connectors are represented by darkened squares 92 to permit ready differentiation between what is mounted on the board 12 and what is external to it. Rather than drive the drive wires from a selected voltage at the initial end to a grounded sink end, the ground must be reversed with either a positive or negative voltage being applied at the sink and the initial end being selectively grounded through the diode decoder arrays 50. The 8X drive wire common sink groups are connected through switches $\overline{\text{SWX0}}$ – $\overline{\text{SWX7}}$ respectively and resistors 94, 96 to positive and negative voltage buses 98, 100 respectively. These buses in turn connect through switches 102, 104 to positive and negative voltage sources. The sink ends of the Y drive wires are connected in a manner similar to the manner of connection of the sink ends of the X drive wires. The initial ends of the drive wires are connected in the same way for both common and separate drive schemes except that for the common scheme the Y driver switches can be eliminated and the common X terminals connect to ground instead of the common X and Y terminals connecting through switches and resistors to positive and negative voltage buses.

A single core 84 such as core X0, Y0 is switched by passing half select current through an X drive line in a given direction and half select current through a Y drive line in the opposite direction. Thus by closing switches $\overline{\text{SWX0}}$ and SWXCC0 half select current is passed through drive line X0 in a negative direction. Similarly, by closing switches $\overline{\text{SWY0}}$ and SWXCA0 a positive current is passed through drive line Y0. These currents are additive when they intersect with core X0, Y0 and cause it to switch to one state. By reversing the two currents, the core can be switched to the opposite state.

Although there have been described above specific arrangements of planar core memory stacks in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. A planar core memory stack comprising a printed circuit board having two planar sides for receiving mats of cores for mounting thereon with only one side having mats mounted thereon at a time, the board having connectors and circuits printed thereon including printed connectors and circuits providing alternative circuit component connection locations for accommodating any one of a plurality of word sizes and any one of a plurality of bit sizes for each word size; a plurality of mats mounted on a selected side of the printed circuit board and lying in a single plane, each mat including a plurality of core elements switchable between two stable states; a plurality of continuous drive wires inductively coupled to simultaneously switch one core element in each mat, each drive wire inductively coupling at least one core from each mat without internal interruption of the drive wire; and means inductively coupled to the core elements of each mat for selectively sensing and inhibiting the switching of core elements.

2. A planar core memory stack comprising:

a generally planar two-sided printed circuit board having printed connectors positioned symmetrically about an axis, circuits printed on both sides of the printed circuit board and plated holes extending through the printed circuit board to provide electrical connection between circuits on different sides of the board, the printed circuits and plated holes being arranged to simultaneously provide electrical connection between wires for one maximum number of cores mounted on one side of the board and the printed connectors when they are to be pluggably attached in a first orientation and between wires for a different maximum number of cores mounted on the other side of the board and the printed connectors when they are to be pluggably attached in a second orientation rotated 180° about the axis from the first orientation, only one side of the board having cores mounted thereon at any one time;

a plurality of magnetic cores which are switchable between two stable states lying in a plane mounted adjacent a selected side of the printed circuit board, the number of cores not exceeding the maximum number of cores for which electrical connection is provided on the selected side; and a plurality of wires inductively coupled to control and sense the switching of the magnetic cores between their two stable states.

3. The invention as set forth in claim 2 above, wherein the control and sense wires are connected to the printed connectors in a first order when the magnetic cores are mounted adjacent one side and in a second order rotated 180° about the axis from the first order when the magnetic cores are mounted adjacent the other side.

4. The invention as set forth in claim 2 above, wherein said printed circuits accommodate a variety of numbers of magnetic cores and arrangements of control and sense wires on each side of the board by providing alternative locations for connection to the printed circuits.

5. The invention as set forth in claim 2 above, further comprising a plurality of diode decoder arrays, each array having a common anode and a common cathode, pairs of diodes connected in series to carry current from the common anode to the common cathode, center taps at the junctions of the diode pairs, and external leads connected to the common anode, common cathode and center taps, the printed circuits including circuits for connecting the common anode and cathode leads to selected printed connectors and for connecting the center tap leads to control wires.

6. The invention as set forth in claim 2 above, wherein electrical connections are provided to accommodate a maximum number of magnetic cores on one side of the printed circuit board for a memory of 4,096 words by 18 bits and a maximum number of magnetic cores on the other side of the printed circuit board for a memory of 2,048 words by 18 bits.

7. The invention as set forth in claim 6 above, wherein the printed connectors lie in two parallel rows along one edge of the board on opposite sides thereof and the axis lies within the plane of the board and is perpendicular to the two parallel rows.

8. A core memory comprising:

a plurality of mats lying in single plane, each mat including a plurality of core elements switchable between two stable states and arranged in a closely spaced double herringbone pattern;

a plurality of longitudinal and latitudinal drive wires inductively coupled to selectively switch the core elements, said drive wires including X and Y drive wires inductively coupling the core elements in an anti-coincident current arrangement, each drive wire having an initial end and a sink end;

a plurality of diode decoder arrays, each having a common anode, a common cathode, a plurality of series connected pairs of diodes connected to conduct current from the common anode to the common cathode and a plurality of center taps, each center tap being connected to a common junction of a different diode pair, and each center tap being connected to an initial end of one drive wire with half the center taps of each diode decoder array being connected to X drive wires and the remaining center taps being connected to Y drive wires;

means for selectively connecting each common anode and each common cathode to ground;

a plurality of X sink groups of interconnected sink ends of X drive wires, each drive wire within each X sink group having the initial end thereof connected to a center tap within a different decoder matrix;

a plurality of Y sink groups of interconnected sink ends of Y drive wires, each drive wire within each Y sink group having the initial end thereof connected to a center tap within a different decoder matrix;

means for selectively connecting each X sink group and each Y sink group to positive and negative voltages; and means inductively coupled to the core element of each mat for selectively sensing and inhibiting the switching of the core elements.

9. A core memory comprising a plurality of mats lying in a single plane, each mat including a plurality of core elements switchable between two stable states and arranged in a closely spaced double herringbone pattern;

at least four mat positions forming a planar matrix having at least two rows and two columns of mat positions with the positions located at corners of the matrix being corner mat positions, a plurality of mat positions being occupied by the plurality of mats with each mat occupying a different mat position;

a plurality of longitudinal and latitudinal drive wires inductively coupled to selectively switch the core elements, the drive wires including a plurality of longitudinal X drive wires and a plurality of latitudinal Y drive wires, the X drive wires passing sequentially through the rows of mat positions beginning with one corner mat position and ending with a different corner mat position, a different plurality of core elements from each occupied mat position being coupled by each X drive wire, the Y drive wires passing sequentially through the columns of mat positions beginning with one corner mat position and ending with a different corner mat position, a different plurality of core elements from each occupied mat position being coupled by each Y drive wire, approximately one-fourth of the X drive wires beginning at each corner mat position, approximately one-fourth of the X drive wires ending at each corner mat position, approximately one-fourth of the Y drive wires beginning at each corner mat position and approximately one-fourth of the Y drive wires ending at each corner mat position;

and means inductively coupled to the core elements of each mat for selectively sensing and inhibiting the switching of the core elements.

10. A core memory comprising a plurality of mats lying in a single plane, each mat including a plurality of core elements switchable between two stable states and arranged in a closely spaced double herringbone pattern;

a plurality of longitudinal and latitudinal drive wires inductively coupled to selectively switch the core elements;

means inductively coupled to the core elements of each mat for selectively sensing and inhibiting the switching of the core elements;

a printed circuit board receiving the mats for mounting adjacent a selected side thereof and including a generally planar two-sided substrate having connectors printed thereon which are symmetrically disposed about an axis; and circuits printed on both sides of the substrate having plated hole connections therebetween, said circuits interconnecting terminal receiving points with the printed connectors for pluggable connection in a first orientation when the mats are adjacent one side and an opposite orientation rotated 180° about the axis when the mats are adjacent the other side.

11. A core memory comprising:

at least one mat having a plurality of core memory elements which are switchable between two stable states arranged in rows and columns with anti-coincident current orientations;

a plurality of X and Y drive wires having initial ends and sink ends, each inductively coupling all of the memory elements in a different row and column respectively;

a plurality of diode decoder arrays, each having a common anode, a common cathode, a plurality of series connected pairs of diodes connected to conduct current from the common anode to the common cathode and a plurality of center taps, each center tap being connected to a common junction of a different diode pair, and each center tap being connected to an initial end of one drive wire with half of the center taps of each decoder array being connected to X drive wires and the remaining center taps being connected to Y drive wires;

means for selectively connecting each common anode and each common cathode to ground;

a plurality of X sink groups of interconnected sink ends of X drive wires, each drive wire within each X sink group having the initial end thereof connected to a center tap within a different diode decoder array;

a plurality of Y sink groups of interconnected sink ends of Y drive lines, each drive wire within each Y sink group having the initial end thereof connected to a center tap within a different diode decoder array; and means for selectively connecting each X sink group and each Y sink group to positive and negative voltages.

12. The invention as set forth in claim 11 above, further comprising means for selectively sensing and inhibiting the switching of a core memory element from one stable state to another.

13. The invention as set forth in claim 11 above, wherein each diode decoder array includes a first subarray having center taps connected to initial ends of X drive wires and a second subarray having center taps connected to initial ends of Y drive wires, the common anodes of the first and second subarrays being interconnected and the common cathodes of the first and second subarrays being interconnected.

14. The invention as set forth in claim 11 above, wherein said at least one mat comprises a plurality of mats lying in a single plane.

15. The invention as set forth in claim 14 above, further comprising means coupled to selectively sense and inhibit the switching of core elements.

16. For use in a core memory having first switches connectable to selectively couple common anodes and common cathodes to ground, and second switches connectable to selectively couple X and Y sink groups to positive and negative voltages, a core memory stack comprising:

at least one mat having a plurality of core memory elements which are switchable between two stable states arranged in rows and columns with anti-coincident current orientations;

a plurality of X and Y drive wires having initial ends and sink ends, each inductively coupling all of the memory elements in a different row and column respectively of each mat;

a plurality of diode decoder arrays, each having a common anode, a common cathode, a plurality of series connected pairs of diodes connected to conduct current from the common anode to the common cathode and a plurality of center taps, each connecting the common junction of a different diode pair to an initial end of one drive wire, the center taps of each diode decoder array being connected to one group of X drive wires and one group of Y drive wires; and a plurality of X and Y sink groups of interconnected sink ends of X and Y drive wires respectively, all of the drive wires within each sink group having their initial ends connected to center taps of different diode decoder arrays.

17. The invention as set forth in claim 16 above, further comprising means for sensing the switching of a core memory element from one stable state to another.

18. A core memory stack comprising:

at least four mat positions lying in a planar matrix having at least two rows and two columns of mat positions;

a plurality of mats, each occupying a different mat position and including a matrix of core elements switchable between two stable states arranged in rows and columns;

a plurality of X drive wires, each passing sequentially through the rows of mat positions beginning with one mat position and ending with a different mat position and each inductively coupling one row of core elements from each occupied mat position, not more than one-fourth of the X drive wires beginning with any single mat position and not more than one-fourth of the X drive wires ending with any single mat position; and a plurality of Y drive wires, each passing sequentially through the columns of mat positions beginning with one mat position and ending with a different mat position and each inductively coupling one column of core elements from each occupied mat position, not more than one-fourth of the Y drive wires beginning with any single mat position and not more than one-fourth of the Y drive wires ending with any single mat position.

19. The invention as set forth in claim 18 above, wherein one-fourth of the X drive wires begin with each of four selected mat positions, one-fourth of the X drive wires end with each of the four selected mat positions, one-fourth of the Y drive wires begin with each of the four selected mat positions and one-fourth of the Y drive wires end with each of the four selected mat positions.

20. The invention as set forth in claim 19 above, further comprising means for selectively sensing and inhibiting the switching of core elements.

21. A core memory comprising:

at least four similar mats of magnetic cores which are switchable between two stable states, the cores in each mat being arranged in longitudinal rows and latitudinal columns, said mats being arranged to form a planar matrix having at least two rows and two columns with the mats positioned at the corners of the planar matrix of mats being corner mats;

a plurality of longitudinal drive lines, each having an initial end and a sink end, each continuously magnetically coupling all of the cores in a corresponding row from each mat, the locations of the cores nearest the initial ends being substantially evenly divided among the corner mats, and the locations of the cores nearest the sink ends being substantially evenly divided among the corner mats; and a plurality of latitudinal drive lines having an initial end and a sink end, each continuously magnetically coupling all of the cores in a corresponding column from each mat, the locations of the cores nearest the initial ends being substantially evenly divided among the corner mats, and the locations of the cores nearest the sink ends being substantially evenly divided among the corner mats.

22. The invention as set forth in claim 21 above, further comprising means associated with each mat for sensing the switching of a core therein.

23. A core memory comprising:

at least four similar mats, each having a plurality of magnetic cores which are switchable between two stable states arranged in longitudinal rows and latitudinal columns, said mats being positioned to form a planar matrix of mats having at least two rows and two columns with the mats at the corners of the planar matrix being corner mats; and a plurality of longitudinal and latitudinal drive wires, each magnetically coupling in series all of the cores from one corresponding row and column respectively of each mat with a first core at one end of the series and a last core at the opposite end of the series, the locations of the first cores being substantially evenly distributed among the corner mats and the locations of the last cores being substantially evenly distributed among the corner mats.

24. For use in a core memory, a four corner drive memory stack comprising:

at least four memory planes, each having a plurality of magnetic cores switchable between two stable states arranged in rows and columns;

a plurality of longitudinal drive wires, each inductively coupling in series on row of cores from each memory plane with a row adjacent one end being an initial row and a row adjacent the other end being a terminal row, the locations of said initial and terminal rows being substantially evenly divided among at least four memory planes; and a plurality of latitudinal drive wires, each inductively coupling in series one column of cores from each memory plane with a column adjacent one end being an initial column and a column adjacent the other end being a terminal column, the locations of said initial and terminal columns being substantially evenly divided among at least four memory planes.

25. A core memory comprising:

a substrate having at least four mat positions thereon, said mat positions forming a matrix having at least two rows and two columns of mat positions;

a plurality of mats, each occupying a different mat position and each including a plurality of magnetic memory elements which are switchable between two stable states arranged in rows and columns;

a plurality of guides maintaining proper alignment of drive wires, said guides being positioned in selected row and column locations for memory elements which are adjacent the periphery of the matrix of mat positions and which are in unoccupied mat positions;

a plurality of longitudinal drive wires, each passing sequentially through all the rows of mat positions beginning with one mat position and ending with a different mat position, each inductively coupling one row of memory elements from each mat, and each being coupled to at least one guide element, no single mat position being the beginning mat position for all of the longitudinal drive wires and no single mat position being the ending mat position for all of the longitudinal drive wires; and a plurality of latitudinal drive wires, each passing sequentially through all the columns of mat positions beginning with one mat position and ending with another mat position, each inductively coupling one column of memory elements from each mat and each being coupled to at least one guide element, no single mat position being the beginning mat position for all of the latitudinal drive wires and no single mat position being the ending mat position for all of the longitudinal drive wires.

26. The invention as set forth in claim 25 above, further comprising means inductively coupling the at least one mat for selectively sensing and inhibiting the switching of core elements therein.

27. The invention as set forth in claim 25 above, wherein each guide is a magnetic memory element.

28. For use in a core memory, a printed circuit board receiving a planar core matrix adjacent a selected side comprising a generally planar two-sided substrate having connectors printed thereon which are symmetrically located about an axis and circuits printed on both sides of the substrate and including plated hole connections therebetween, said circuits interconnecting terminal receiving points with the printed connectors for pluggable connection in a first orientation when the core matrix is adjacent one side and in an opposite orientation rotated 180° about the axis when the core matrix is adjacent the other side.

29. For use in a core memory, a printed circuit board comprising a generally planar two-sided substrate having connectors printed thereon which are symmetrically located about an axis and which are assigned signals to be carried thereby in a first order when magnetic cores are positioned adjacent one side and in a second order rotated 180° about the axis from the first order when magnetic cores are positioned adjacent the other side, the printed circuit board further comprising printed circuits, including plated holes connecting circuits on opposite sides, providing electrical connection between terminal receiving points on both sides of the printed circuit board and the printed connectors for communication of signals to associated circuitry.

30. For use in a core memory, a printed circuit board comprising:

a generally planar two-sided substrate;

a plurality of connectors positioned symmetrically about an axis printed on the substrate;

a plurality of circuits printed on both sides of the substrate; and a plurality of plated through holes extending through the substrate to provide electrical connection between circuits printed of different sides of the substrate, the printed circuits and plated holes being arranged to simultaneously provide electrical connection between wires for one maximum number of cores mounted on one side of the board and the printed connectors when they are to be pluggably attached in a first orientation, and wires for a different maximum number of cores mounted on the other side of the substrate and the printed connectors when they are to be pluggably attached in a second orientation rotated 180° about the axis from the first orientation, only one side of the board having cores mounted thereon at any one time.

31. The invention as set forth in claim 30 above, wherein the connectors are positioned along one edge of the substrate on both sides thereof and the axis lies within the plane of the substrate perpendicular to the edge.

32. For use in a variable bit length and word length planar core memory stack a printed circuit board comprising:

a substrate having first and second planar surfaces, the first planar surface having circuits printed thereon for accommodating electrical connections of a maximum word length and bit length planar core memory stack to proper plug connections and diode decoder arrays and for connecting the diode decoder arrays to proper plug connections when the board is in a first plug connection orientation, the second planar surface having circuits printed thereon for accommodating electrical connections of a planar core memory stack having a maximum bit length and a maximum word length less than the maximum word length accommodatable by the printed circuits of the first planar surface to proper plug connections and diode decoder arrays and for connecting the diode decoder arrays to proper plug connections when the board is rotated 180° about an axis to a second plug connection orientation; and a plurality of plug connections attached to the substrate, said connections being arranged symmetrically about an axis to permit plug compatibility when the substrate is in opposite positions rotated 180° about the axis, the number of plug connections being sufficient to accommodate a memory stack of maximum bit and word sizes.

* * * * *